C. L. FLORA.
AUTOMOBILE STEERING GEAR.
APPLICATION FILED MAR. 16, 1915.
1,169,025.
Patented Jan. 18, 1916.
2 SHEETS—SHEET 1.
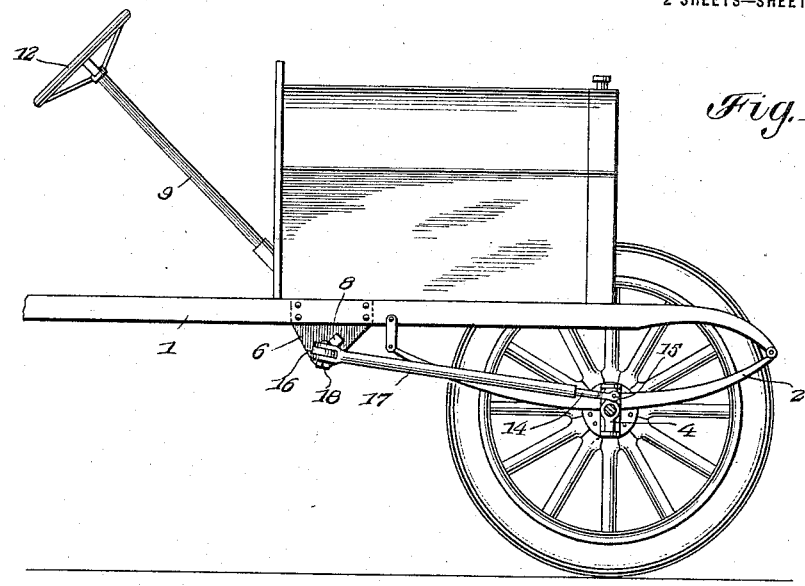
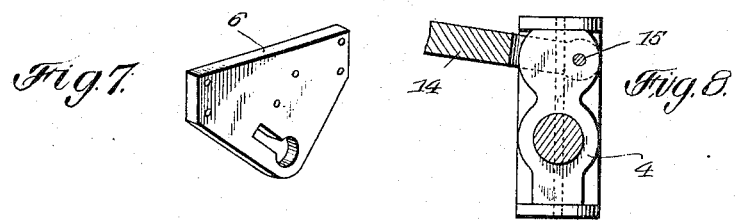
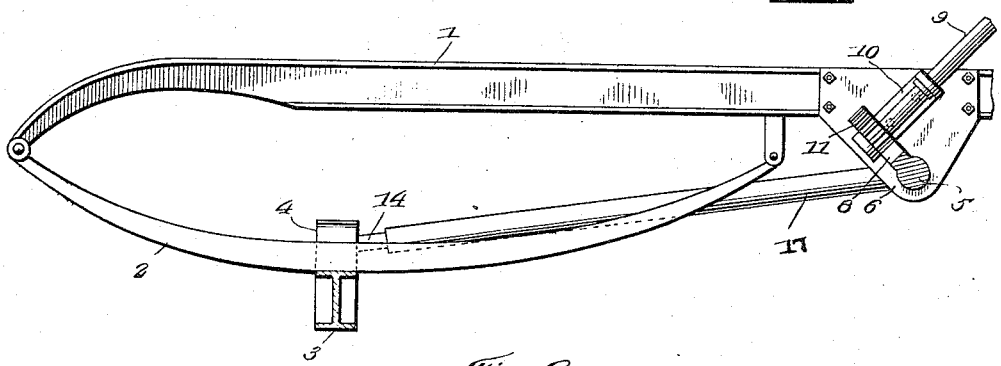
Witnesses
J. H. Crawford
J. W. Garner
Inventor
C. L. Flora,
By Victor J. Evans
Attorney C. L. FLORA.
AUTOMOBILE STEERING GEAR.
APPLICATION FILED MAR. 16, 1915.
1,169,025.
Patented Jan. 18, 1916.
2 SHEETS—SHEET 2.
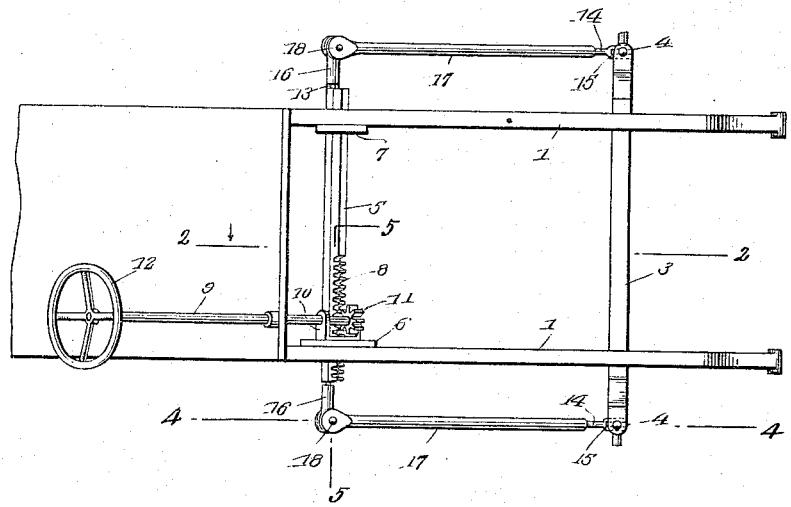
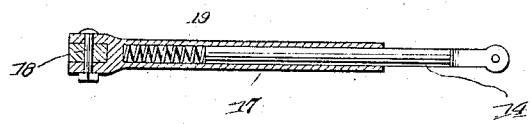
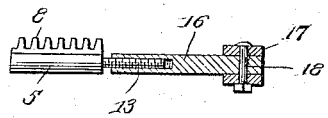
Witnesses
Inventor
C. L. Flora,
By Victor J. Evans
Attorney

UNITED STATES PATENT OFFICE.

CHARLES L. FLORA, OF TOLEDO, OHIO.

AUTOMOBILE STEERING-GEAR.

1,169,025. Specification of Letters Patent. Patented Jan. 18, 1916.

Application filed March 16, 1915. Serial No. 14,733.

*To all whom it may concern:*

Be it known that I, CHARLES L. FLORA, a citizen of the United States, residing at Toledo, in the county of Lucas and State of Ohio, have invented new and useful Improvements in Automobile Steering-Gears, of which the following is a specification.

This invention relates to improvements in automobile steering gears, an object of the invention being to provide an improved automobile steering gear which is cheap and simple in construction and which may be readily operated.

Other objects will appear as the nature of the invention is more fully understood.

The invention consists in the construction, combination and arrangement of devices hereinafter described and claimed.

In the accompanying drawings:—Figure 1 is a side elevation of the front portion of an automobile provided with my improvement, one of the wheels being removed, Fig. 2 is a vertical longitudinal sectional view approximately on the line 2—2 of Fig. 3, Fig. 3 is a top plan view of the forward portion of the frame to which the improvement is attached, Fig. 4 is a longitudinal sectional view approximately on the line 4—4 of Fig. 3, Fig. 5 is a detail transverse sectional view approximately on the line 5—5 of Fig. 3, Fig. 6 is a detail perspective view of the toothed end of the link bar provided with the threaded extension, Fig. 7 is a detail perspective view of the bracket 6, and Fig. 8 is an enlarged side elevation of one of the steering members, the axle spindle being in section and the rod 14 being also shown in section.

For the purposes of this specification the front portions of the chassis bars are shown at 1 the front springs at 2 and the front axle at 3. The steering knuckles are indicated at 4.

In accordance with my invention I provide a link bar 5 which is slidably mounted in brackets 6—7 which are respectively bolted to the inner sides of right and left hand bars 1 and depend therefrom. The link rod is provided on its front side with rack teeth 8 and the link rod is arranged in an inclined position cross sectionally at right angles to the steering shaft 9, the said steering shaft being mounted in bearings 10 on the inner side of the bracket 6 and being provided at its lower end with a pinion 11 which engages the rack teeth of the link bar. The usual steering wheel 12 is at the upper end of the steering shaft. The link rod is provided at its ends with threaded stems 13. A rod 14 is pivotally connected as at 15 to each steering knuckle. A sleeve 16 is threaded on each stem 13 of the link rod and a tubular sleeve 17 is pivotally connected by a bolt 18 to each sleeve 16 the said bolt being at right angles to the axis of said sleeve. As here shown the tubular sleeves have their rear ends bifurcated to receive the outer ends of the sleeves 16. The sleeves 16 are adapted to turn in a vertical plane on the ends of the link rod and the tubular sleeves are adapted to turn pivotally at right angles to the pivotal movement of the sleeves 16 so that in effect the said sleeves form universal joints at the ends of the link rod. The rods 14 operate and are movable longitudinally in the bores of the tubular sleeves 17 to compensate for vertical movement of the axle and its spring 3. Coiled cushioning springs 19 are at the inner ends of the bores of the tubular sleeves and are engaged and compressed by the rods 14. In effect the said rods 14 combine with the tubular sleeves 17 to form cushioning longitudinally extensible connections between the steering knuckles and the link rod and said connections are adapted to be attached to the ends of the said link rod for universal angular movement so that freedom of movement is secured for the link rod the said connections and the steering knuckles under all conditions and irrespective of vertical movements of the front axle.

It will be understood that by turning the steering shaft by means of the steering wheel its pinion will coact with the rack teeth of the link rod to move the latter lengthwise in either direction as required in steering the automobile. The cushioning springs between the rods 14 and the tubular sleeves 17 keep them constantly under tension so as to prevent rattling and also exert rearward thrusts on the link rod to prevent the latter from rattling and hence my improved steering gear is noiseless.

While I have herein shown and described a preferred form of my invention I would have it understood that changes may be made in the form, proportion and construction of the several parts without departing from the spirit of the invention and within the scope of the appended claims.

Having thus described my invention, I claim:—

1. In a steering gear of the class described a link rod mounted for longitudinal movement in fixed bearings and provided with rack teeth, in combination with a steering shaft having a pinion engaging the rack teeth of the link rod steering knuckles and longitudinally extensible connections between the steering knuckles and the link rod, said longitudinally extensible connections including yieldable means to normally longitudinally extend them.

2. In combination with chassis bars and the front axle, springs and steering knuckles of an automobile vehicle, fixed supports carried by the chassis bars a link rod mounted for longitudinal movement in said fixed supports and having rack teeth, a steering shaft having a pinion engaging the rack teeth of the link rod, sleeves pivotally mounted on the ends of the link rod, tubular sleeves pivotally connected to the first named sleeves and angularly movable at right angles to the pivotal axis of said first named sleeve, rods pivotally connected to the knuckles and slidably arranged in the bores of said tubular sleeves and expanding cushioning springs in the bores of said tubular sleeves and engaged and compressed by said rod.

In testimony whereof I affix my signature in presence of two witnesses.

CHARLES L. FLORA.

Witnesses:
ROBERT BAUR,
RUSSEL FLORA.